US008635225B1

(12) United States Patent　　(10) Patent No.: US 8,635,225 B1
Jakubik　　(45) Date of Patent: Jan. 21, 2014

(54) REPRESENTATIVE DOCUMENT SELECTION

(71) Applicant: Paul A. Jakubik, Plano, TX (US)

(72) Inventor: Paul A. Jakubik, Plano, TX (US)

(73) Assignee: PureDiscovery Corporation, Dallas, TX (US)

( * ) Notice: Subject to any disclaimer, the term of this patent is extended or adjusted under 35 U.S.C. 154(b) by 0 days.

(21) Appl. No.: 13/827,159

(22) Filed: Mar. 14, 2013

(51) Int. Cl.
*G06F 17/30* (2006.01)

(52) U.S. Cl.
USPC ............. 707/738; 707/608; 707/736; 706/12; 706/14

(58) Field of Classification Search
None
See application file for complete search history.

(56) References Cited

U.S. PATENT DOCUMENTS

| 8,515,958 | B2 * | 8/2013 | Knight | 707/737 |
| 2010/0030780 | A1 * | 2/2010 | Eshghi et al. | 707/6 |
| 2010/0198816 | A1 * | 8/2010 | Kwan | 707/723 |
| 2011/0029526 | A1 * | 2/2011 | Knight et al. | 707/737 |
| 2011/0029529 | A1 * | 2/2011 | Knight | 707/737 |
| 2011/0029530 | A1 * | 2/2011 | Knight et al. | 707/737 |
| 2011/0029532 | A1 * | 2/2011 | Knight et al. | 707/737 |
| 2012/0106798 | A1 * | 5/2012 | Monden | 382/103 |
| 2012/0254184 | A1 * | 10/2012 | Choudhary et al. | 707/738 |
| 2013/0041863 | A1 * | 2/2013 | Schmidtler et al. | 706/46 |

* cited by examiner

*Primary Examiner* — Hung Le
(74) *Attorney, Agent, or Firm* — Baker Botts L.L.P.

(57) ABSTRACT

A method includes accessing a set of documents and a set of representative documents, determining distances from each document to a nearest representative document, and selecting a subset of documents using an algorithm for choosing initial seed values and the determined distances to the nearest representative document. The method further includes repeating the following for each particular document of the subset of documents: adding the particular document to the set of representative documents to create a new set of representative documents, removing the particular document of documents from the set of documents to create a new set of documents, and calculating a sum of distances from each document of the new set of documents to a nearest document in the new set of representative documents. The particular document of the subset that resulted in the lowest sum of distances is selected as a new representative document.

20 Claims, 9 Drawing Sheets

REPRESENTATIVE DOCUMENT SELECTION

TECHNICAL FIELD

This disclosure relates in general to searching of data and more particularly to selecting representative documents.

BACKGROUND

People are often tasked with reviewing large collections of documents. For example, a researcher may find a collection of one hundred documents on a topic of interest to the researcher. As another example, a researcher may be provided a collection of one million documents to review and analyze. Reviewing such large collections of documents is generally burdensome and time consuming.

SUMMARY OF THE DISCLOSURE

According to one embodiment, a method includes accessing a set of documents and a set of representative documents, determining distances from each document to a nearest representative document, and selecting a subset of documents using an algorithm for choosing initial seed values and the determined distances to the nearest representative document. The method further includes repeating the following for each particular document of the subset of documents: adding the particular document of the subset to the set of representative documents to create a new set of representative documents, removing the particular document of the subset of documents from the set of documents to create a new set of documents, and calculating a sum of distances from each document of the new set of documents to a nearest document in the new set of representative documents. The particular document of the subset that resulted in the lowest sum of distances is selected as a new representative document.

Technical advantages of certain embodiments may include providing one or more representative documents for an input set of documents. The representative documents provide an accurate view of the depth and breadth of the input set of documents without having to review every document in the input set of documents. Some embodiments may additionally accept input representative documents and a desired amount of additional representative documents to locate for an input set of documents. Embodiments utilize the input representative documents to locate the amount of additional representative documents desired by the user. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

A person such as a researcher typically is tasked with reviewing collections of documents in order to gain knowledge about a particular subject. For example, a researcher may obtain a large collection of documents on a subject relevant to a topic the researcher is currently studying. The collection of documents may include, for example, one hundred or even one million documents. In order to understand the breadth and depth covered by the collection of documents, the researcher may desire to read a smaller collection of documents (e.g., ten) that are representative of the overall collection.

The teachings of the disclosure recognize that reviewing collections of documents may be burdensome and inefficient. The following describes systems and methods of selecting and providing one or more representative documents for an input collection of documents. The representative documents may improve the efficiency and accuracy of reviewing a large collection of documents.

Figure 1:
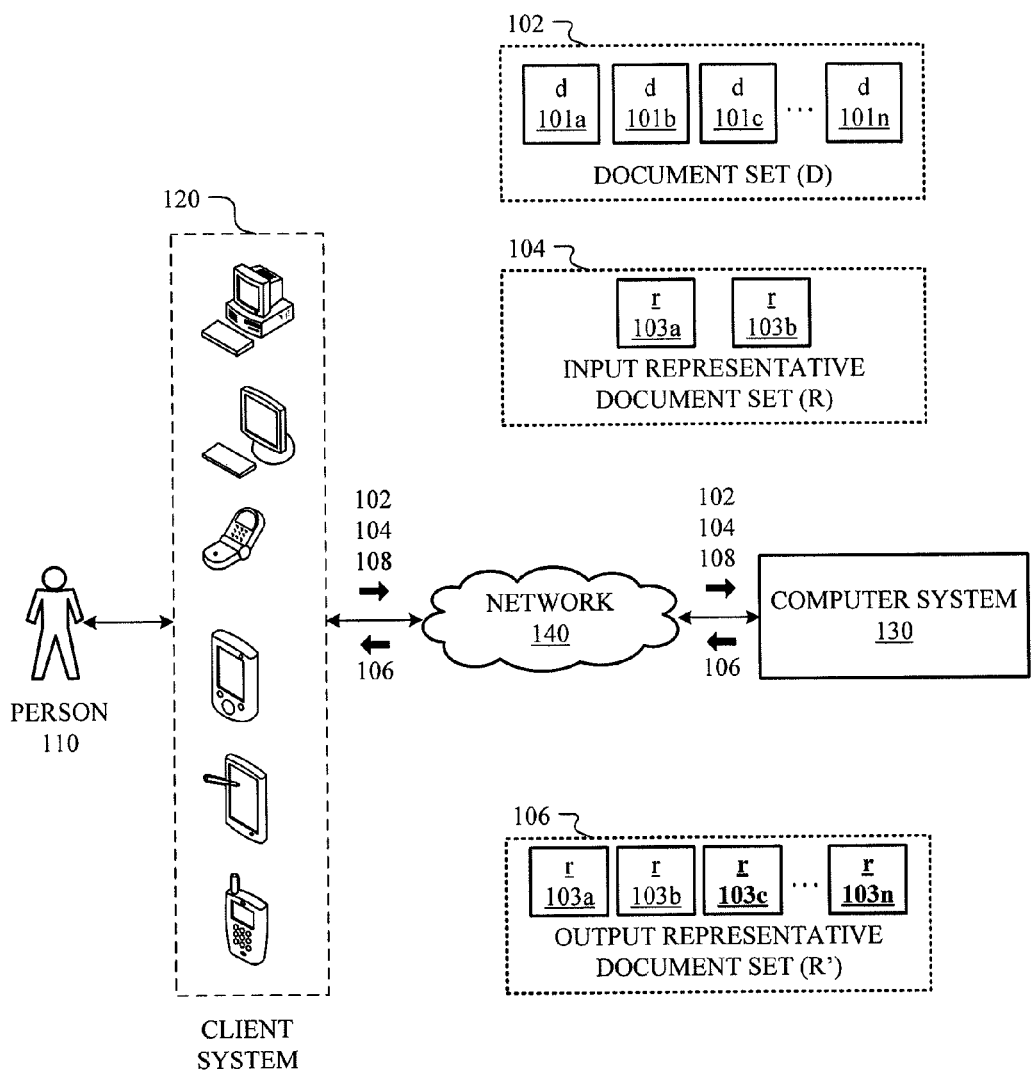
FIG. 1 illustrates a system for providing representative documents, according to certain embodiments.

FIG. 1 illustrates a system 100 for providing representative documents for an input set of documents, according to certain embodiments. System 100 includes a person 110, client systems 120, a computer system 130, and a network 140. Person 110 utilizes client systems 120 to provide an input document set 102 to computer system 130 and receive an output representative document set 106 for input document set 102 back from computer system 130. Network 140 communicatively couples client systems 120 and computer system 130. In certain embodiments, system 100 may include more than one network 140, or may not include a network 140 at all.

In general, person 110 interacts with computer system 130 in order to receive output representative document set 106 for an input document set 102. Input document set 102 may be any collection of documents 101. Input document set 102 may include any number of documents 101 (e.g., ten, one hundred, one million, etc.). As an example for illustrative purposes only, input document set 102 may be a collection of one hundred documents 101 that person 110 wishes to analyze. Person 110 transmits or otherwise indicates input document set 102 to computer system 130. Computer system 130 analyzes input document set 102 and determines one or more representative documents 103 from input document set 102. Computer system 130 then transmits or otherwise indicates one or more representative documents 103 to person 110 as output representative document set 106.

In some embodiments, person 110 transmits or otherwise indicates an input representative document set 104 to computer system 130 along with input document set 102. Input representative document set 104 may include one or more representative documents 103 that person 110 has identified as being representative of input document set 102. For example, as illustrated in FIG. 1, person 110 indicated two input representative documents 103: 103a and 103b. Computer system 130 utilizes input representative document set 104 in order to locate one or more additional representative documents 103 (i.e., representative documents 103c-103n as illustrated in FIG. 1) for input document set 102. Computer system 130 then provides output representative document set 106, which may include the input representative documents 103 along with the additional representative documents 103 discovered by computer system 130.

In some embodiments, person 110 may provide an indication 108 of a number of desired representative documents 103 for input document set 102. For example, person 110 may provide via indication 108 that he would like to be provided ten representative documents 103 for input document set 102. Computer system 130 processes input document set 102 (and any input representative documents 103) using the methods described below to output ten representative documents 103 in output representative document set 106.

Client system 120 may be any electronic device including hardware, software, or embedded logic components or a combination of two or more such components and capable of carrying out the appropriate functionalities implemented or supported by client system 120. As an example and not by way of limitation, a client system 120 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 120. A client system 120 may enable person 110 to access network 140 and interact with computer system 130.

In particular embodiments, client system 120 may include a web browser, such as MICROSOFT INTERNET EXPLORER, GOOGLE CHROME, or MOZILLA FIRE-FOX, and may have one or more add-ons, plug-ins, or other extensions. A user of client system 120 may enter a Uniform Resource Locator (URL) or other address directing the web browser to a particular server, and the web browser may generate a Hyper Text Transfer Protocol (HTTP) request and communicate the HTTP request to server. The server may accept the HTTP request and communicate to client system 120 one or more Hyper Text Markup Language (HTML) files responsive to the HTTP request. Client system 120 may render a webpage based on the HTML files from the server for presentation to person 110.

Computer system 130 may be any suitable computing system in any suitable physical form. As example and not by way of limitation, computer system 130 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 130 may include one or more computer systems 130; be unitary or distributed; span multiple locations; span multiple machines; or reside in a cloud, which may include one or more cloud components in one or more networks. Where appropriate, one or more computer systems 130 may perform without substantial spatial or temporal limitation one or more steps of one or more methods described or illustrated herein. As an example and not by way of limitation, one or more computer systems 130 may perform in real time or in batch mode one or more steps of one or more methods described or illustrated herein. One or more computer systems 130 may perform at different times or at different locations one or more steps of one or more methods described or illustrated herein, where appropriate. A particular embodiment of computer system 130 is described in more detail below in reference to FIG. 5.

Network 140 may refer to any interconnecting system capable of transmitting audio, video, signals, data, messages, or any combination of the preceding. Network 115 may include all or a portion of a public switched telephone network, a public or private data network, a local area network (LAN), an ad hoc network, a personal area network (PAN), a metropolitan area network (MAN), a wide area network (WAN), a local, regional, or global communication or computer network such as the Internet, an enterprise intranet, or any other suitable communication link, including combinations thereof. One or more portions of one or more of these networks may be wired or wireless. Example wireless networks 140 may include a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these.

Figure 3A:
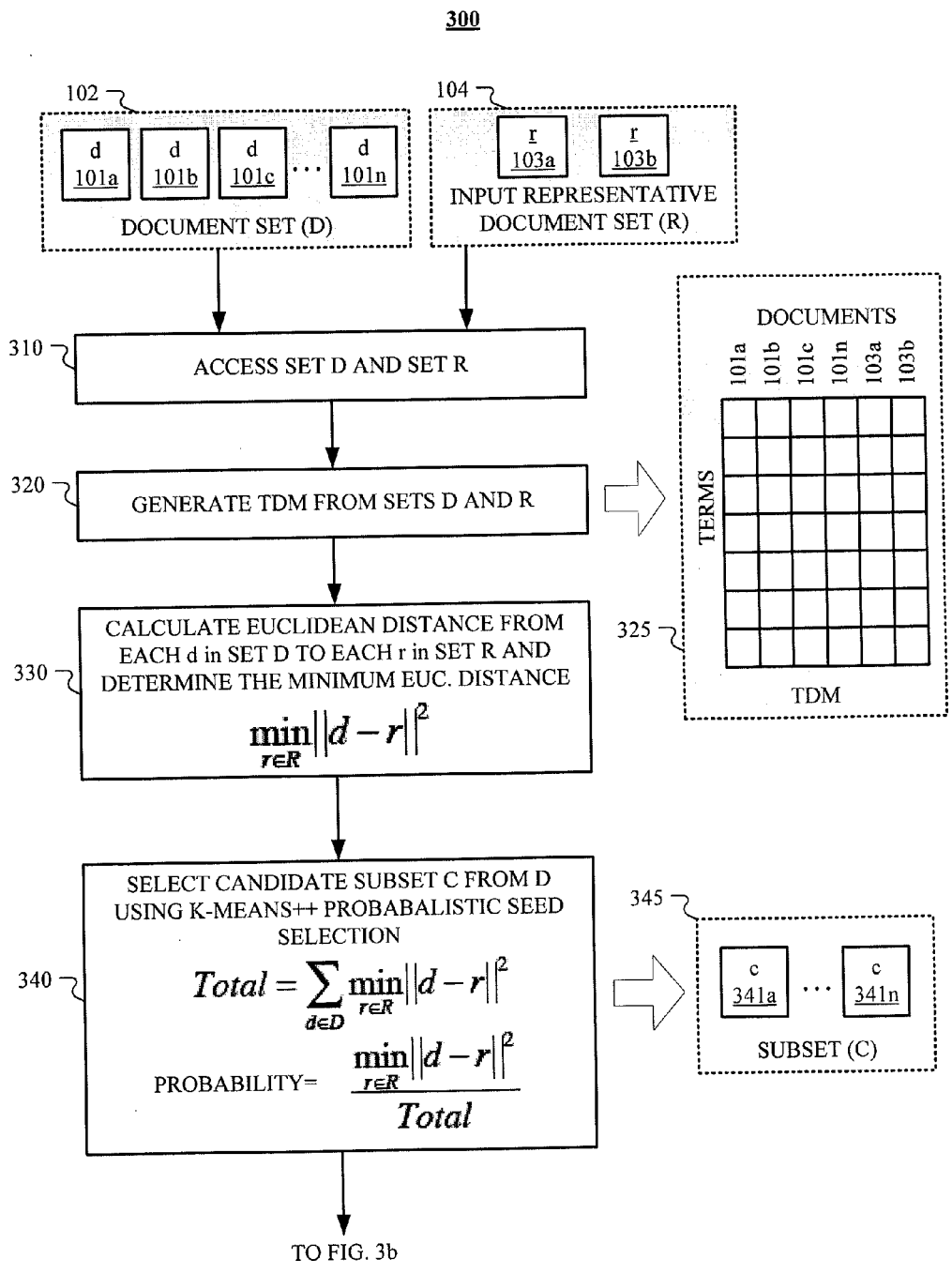
FIGS. 3a and 3b illustrate a method of providing representative documents for input sets of documents, according to certain embodiments.
Figure 3B:
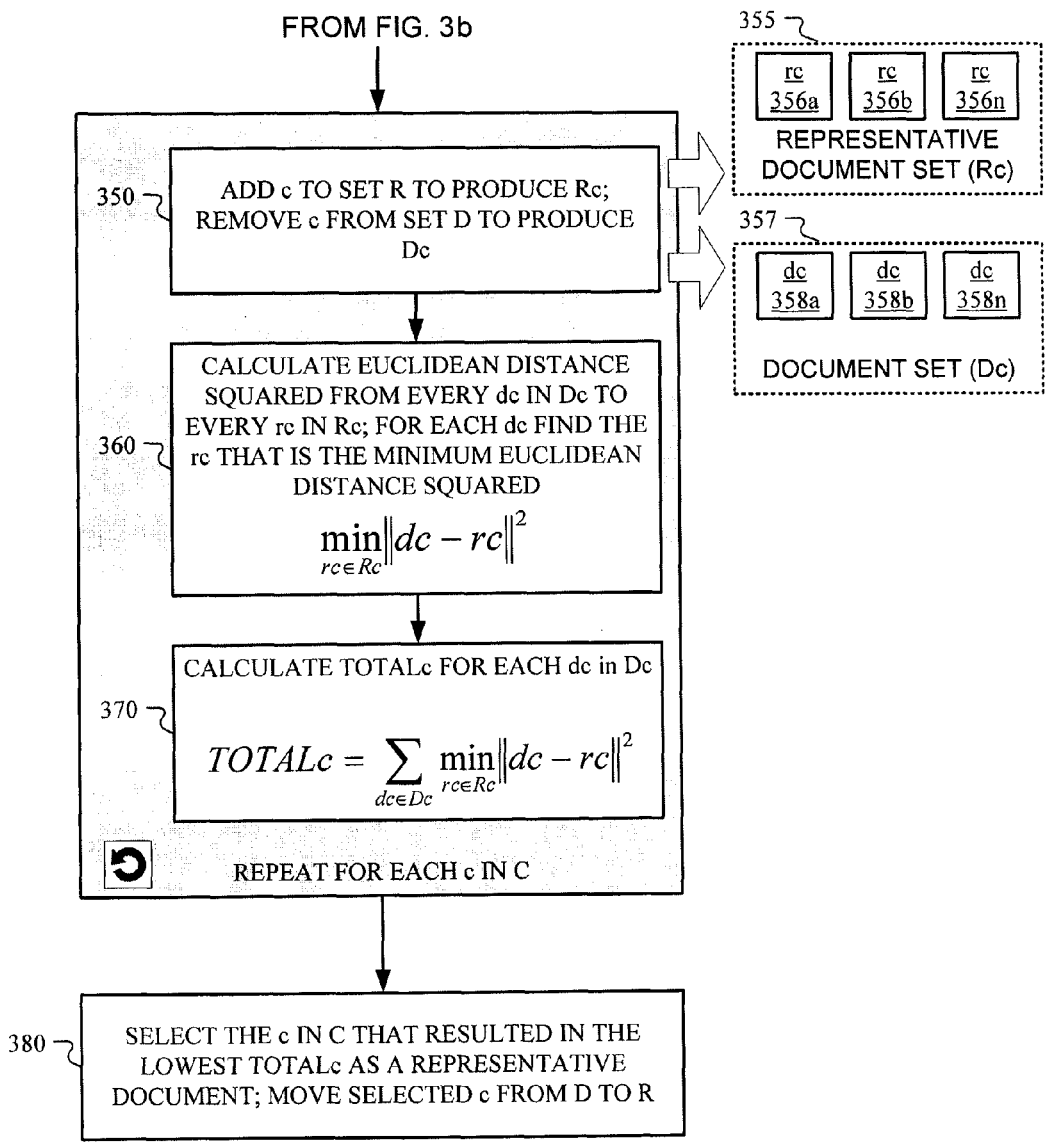
Figure 4:
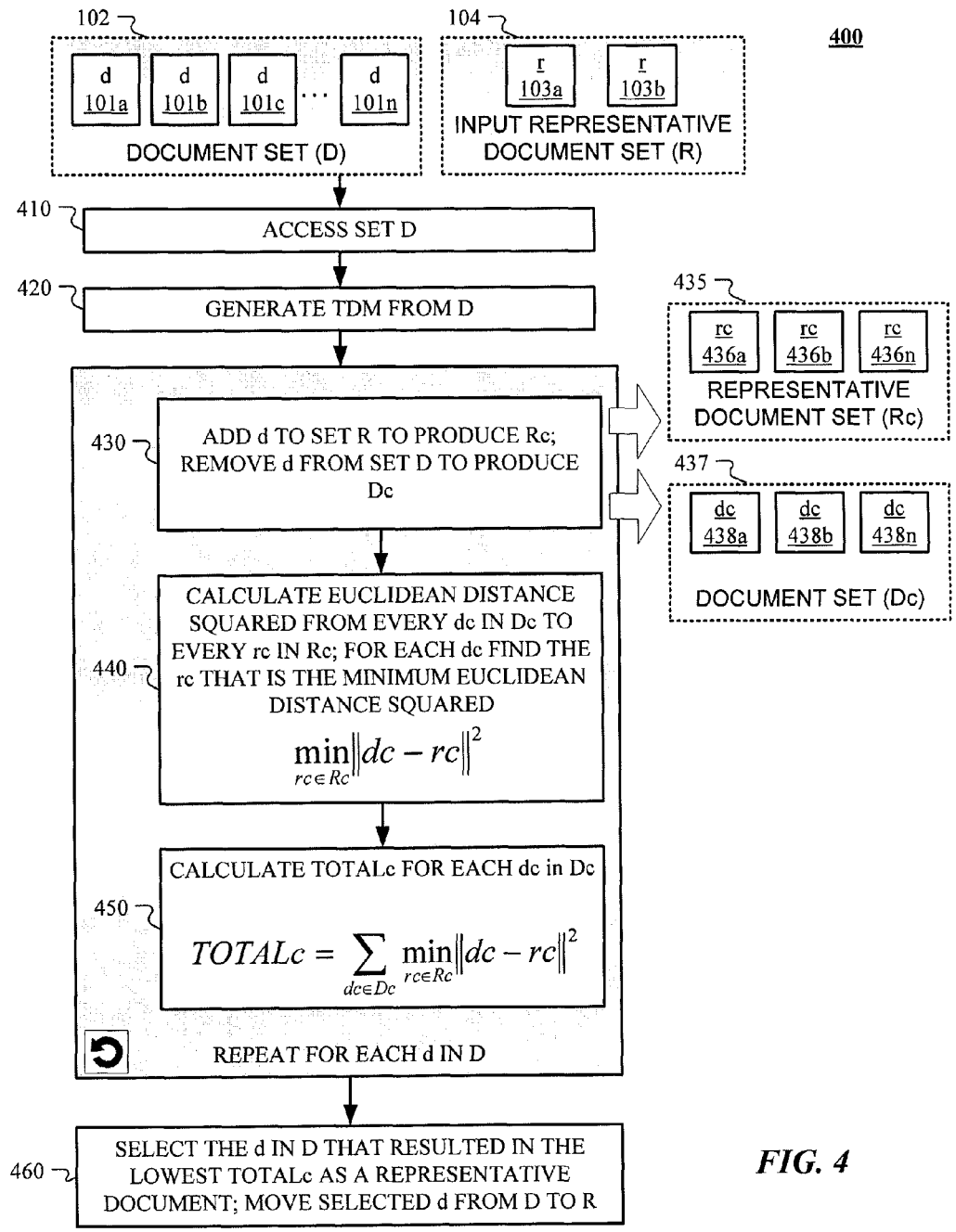
FIG. 4 illustrates another method of providing representative documents for input sets of documents, according to certain embodiments.

In operation, computer system 130 analyzes input document set 102 in order to determine one or more representative documents 103. A representative document 103 is any document within input document set 102 that helps provide an accurate view of the breadth and depth of input document set 102. Representative documents 103 are determined according to the algorithms described below in reference to FIGS. 3a-4. For example, FIGS. 3a-3b illustrate a method 300 that may be used to determine one or more representative documents 103 for a large input document set 102, and FIG. 4 illustrates a method 400 that may be used to determine one or more representative documents 103 for a small input document set 102.

Figure 2A:
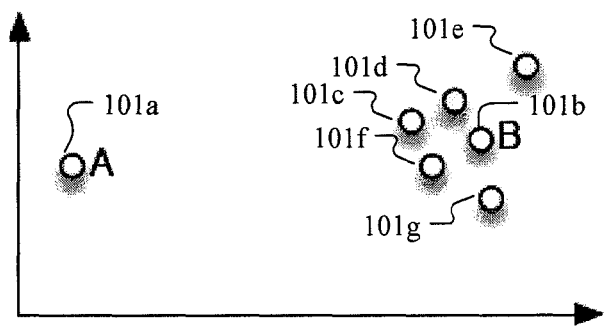
FIGS. 2a-2k illustrate graphical depictions of documents, according to certain embodiments.

FIGS. 2a-2k illustrate graphical depictions of documents 101, according to certain embodiments. FIG. 2a illustrates seven documents 101 (e.g., 101a-101g). Each document 101 is represented as a two dimensional vector and is plotted as a dot on the illustrated graph. In this example, a task may be to select a single representative document 103 for documents 101a-101f. A question may arise as to which document 101 should be selected as the first representative document: 101a or 101b? If only one document 101 is to be selected as a representative document for the collection in the graph, document 101b should be selected as a better representation of the collection than document 101a. In this example, document 101a is an outlier that does not have much in common with the other documents 101 in the collection. Document 101b, on the other hand, is very similar to most other documents 101 in the collection and is a good representation of more documents 101 in the collection than document 101a.

Figure 2B:
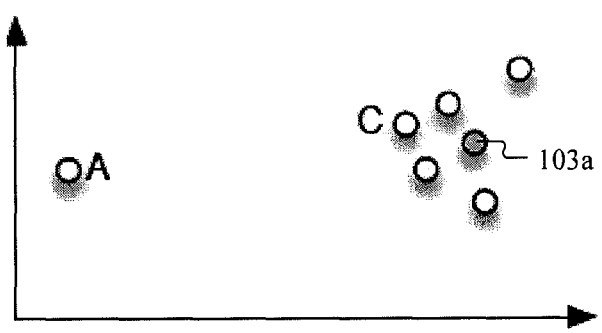

After selecting document 101b as the first representative document 103 in FIG. 2a, a task may arise to select the second best representative document 103 in the collection. For example, FIG. 2b illustrates the collection of FIG. 2a after selecting document 101b as the first representative document 103a. Given that document 101b was already selected to be the first representative document 103a, a question may arise as to which document to select as the second best representative document 103: document 101a or 101c? In this case, since 101b is already a representative document 103, and 101c is very similar to 101b, document 101a provides a deeper understanding of the overall collection more than 101c and should be selected as the second representative document 103.

Figure 2C:
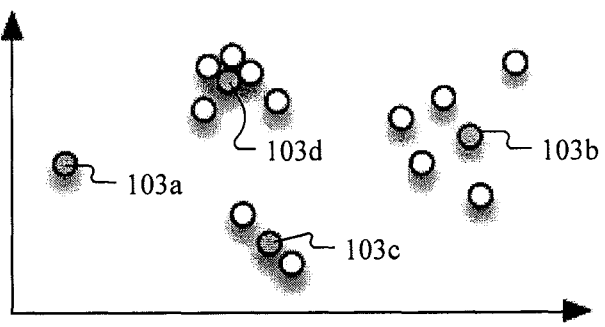

FIG. 2c illustrates sixteen documents 101 from input document set 102 plotted on a graph. In this example, four selected representative document 103 are illustrated: representative documents 103a-103d. In this example, documents 101 from input document set 102 are clustered into four distinct groups. Thus, representative documents 103a-103d accurately capture the breadth and depth of documents 101 in input document set 102.

Embodiments of the disclosure utilize various algorithms for determining representative document 103. Stated graphically, one way to find representative documents 103 would be to find the natural clusters of documents 101 in the collection, and then find the documents 101 closest to the centroids of those clusters. Two dimensional clusters, particularly well defined clusters like those illustrated in FIGS. 2a-2c, provide a graphically way to visualize finding dots close to centers of clumps of dots (i.e., documents 101). Embodiments of the disclosure use some of the components of clustering in algorithms to select representative documents 103. In particular, algorithms of certain embodiments utilize two techniques from clustering for finding representative documents 103: 1) techniques for evaluating the quality of a solution; and 2) techniques for selecting higher quality candidate documents. These two techniques are described in more detail below.

First, certain embodiments evaluate the quality of a solution. To find the best solution, an objective measure of the quality of a candidate solution is used. For example, minimizing the distance from each document 101 to the nearest cluster centroid may be used. In certain embodiments, this may involve minimizing the standard deviation from all documents 101 to the nearest representative document 103. Stated in other words, the measure that is being minimized is the document candidate.

Second, certain embodiments select higher quality candidate documents 101. When selecting a candidate document 101 as a representative document 103 for small input document sets 102, some embodiments compare all documents 101 in the set 102 to each other to find the best one to select (e.g., method 400 below). However, this may quickly become too expensive (e.g., take too much time or computing resources). Once there are too many documents 101 to compare to each other, certain embodiments utilize a k-means++ probabilistic seed selection algorithm to select candidate documents 101 (e.g., method 300 below). In general, several probable candidate documents 101 are identified, and their affect on solution quality is evaluated so the best candidate document 101 may be selected as the next representative document 103 to add to output representative document set 106.

The k-means++ probabilistic seed selection algorithm makes the odds of a document 101 being picked as a candidate document proportional to that document's distance from the nearest representative document 103. If a particular document 101 is already one of the representative documents 103, the probability of it being selected as the next representative document 103 is zero. While some embodiment may manually exclude representative documents 103 from candidate selection, the math behind candidate selection will automatically exclude the representative documents 103. This method of candidate selection makes it likely that the next candidate will be selected from a large cluster of documents 101 that is the furthest away from all of the current representative documents 103.

Figure 2D:
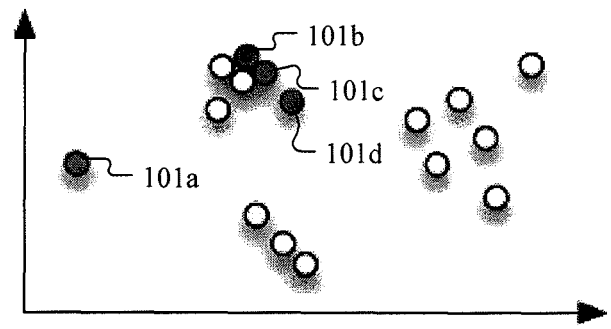
Figure 2E:
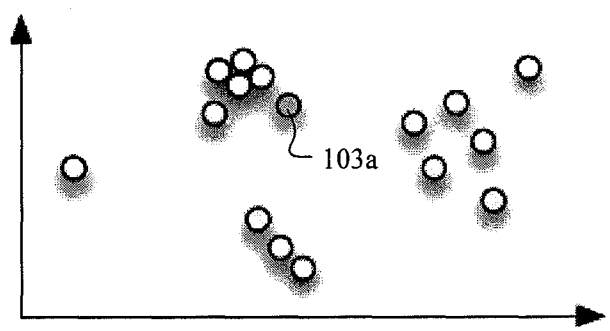

FIG. 2d illustrates probabilistic seed selection and standard deviation quality assessment being used together to pick representative documents 103 from input document set 102. In this example, four documents 101 have been randomly selected: documents 101a-101d. Since no representative documents 103 have been selected yet, the candidates were selected completely at random. Next, each candidate is tested to see what the Euclidean distance standard deviation would be if the candidate was selected as the first representative document 103. For example, FIG. 2e illustrates the candidate with the best score (e.g., document 101d). That candidate becomes the first representative document 103a selected.

Figure 2F:
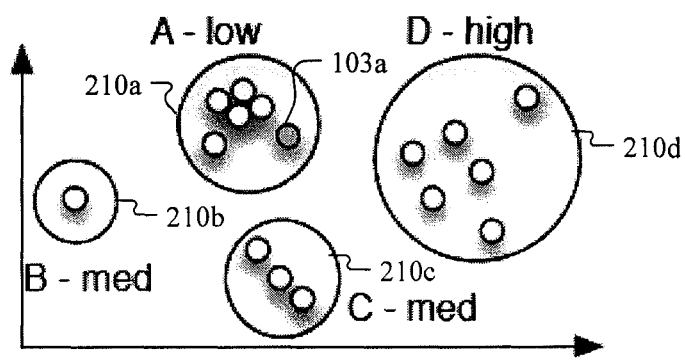

FIG. 2f illustrates the probability of selecting candidates from each cluster of documents. As discussed above, the probability of any particular document 101 being selected as a candidate is proportional to its distance from the nearest representative document 103. In the illustrated example of FIG. 2f, documents 101 are clustered into four clusters: clusters 210a-210d. The probabilities that documents 101 in clusters 210a-210d will be selected by the k-means++ probabilistic seed selection algorithm are as follows.

Group 210a (low probability): While there are many documents 101 in group 210a, all are very close to the representative document 103a. So the overall probability that any one of these candidates is picked as a candidate is low.

Group 210b (medium probability): Group 210b is very far away from representative document 103a, but only has one document in the group. So group 210b only has a medium probability of being a candidate.

Group 210c (medium probability): Group 210c is not as far away from representative document 103a as Group 210b, but it has contains a few documents. This gives it roughly the same odds of contributing a candidate as Group 210b.

Group 210d (high probability): Group 210d contains several documents that are just as far away from representative document 103a as the document 101 in Group 210b. By virtue of containing many distant documents 101 from representative document 103a, there is a high probability that candidate documents will be selected from Group 210d.

Figure 2G:
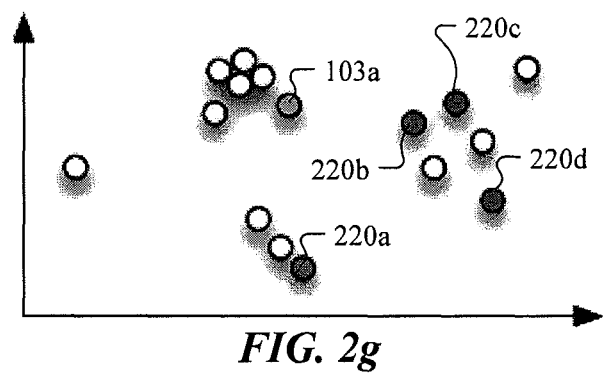

When the k-means++ probabilistic seed selection is used to select candidate documents 101, each document 101 is assigned its own probability proportional to its distance from the nearest representative document 103a. The probabilistic seed selection tends to find documents 101 that represent clusters of documents that are most distinct from the current set of representative documents 103. Based on the probabilities of each document 101, four candidates were randomly selected as illustrated in FIG. 2g. In this example, documents 220a-220d were selected as candidates and may form a subset of documents such as subset 345 discussed below.

Figure 2H:
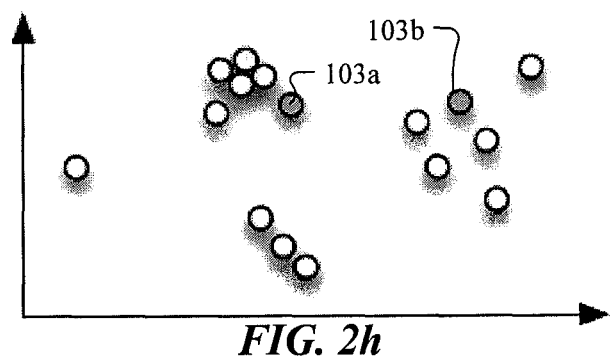
Figure 2I:
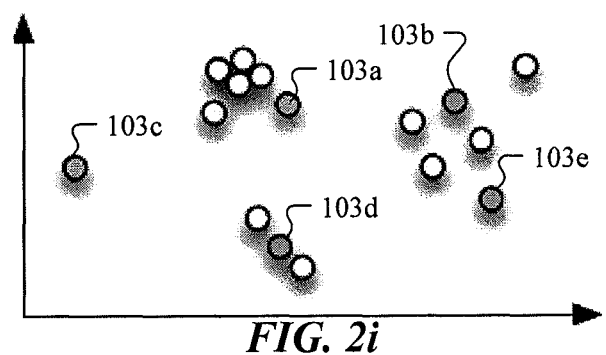

After selecting candidate documents 220a-220d, the candidates may be evaluated to select a second representative document 103. FIG. 2h illustrates the selection of a second representative document 103b. More rounds of probabilistic seed selection and identification of the best representative document out of each set of candidates may be performed to select additional representative documents. FIG. 2i illustrates the selection of additional representative documents 103c-103e.

As discussed above, probabilistic seed selection is used in certain embodiments for calculating the probability that each document 101 should be a candidate. In some embodiments, the distance between documents may refer to the square of the Euclidean distance. Thus the distance from a document 101 to the nearest representative document 103 is actually the square of the Euclidean distance between a document and the nearest representative document 103. To calculate the probability that each document 101 should be used as a candidate, certain embodiments first calculate Total, where Total is the sum of the distances from each document 101 to the nearest repre sentative document 103. Equation 1 below illustrates a formula for calculating Total:

$$\text{Total} = \sum_{d \in D} \min_{r \in R} \|d - r\|^2 \quad \text{(Equation 1)}$$

Here, D is the input set of documents 101 (e.g., input document set 102), R is the set of representative documents 103 already selected from D, d is a vector of a document 101 in D, and r is a vector of a representative document 103 in R. Once Total is calculated, the probability for a particular document d in D being selected as a candidate may be calculated by Equation 2 below:

$$\frac{\min_{r \in R} \|d - r\|^2}{\text{Total}} \quad \text{(Equation 2)}$$

Figure 2J:
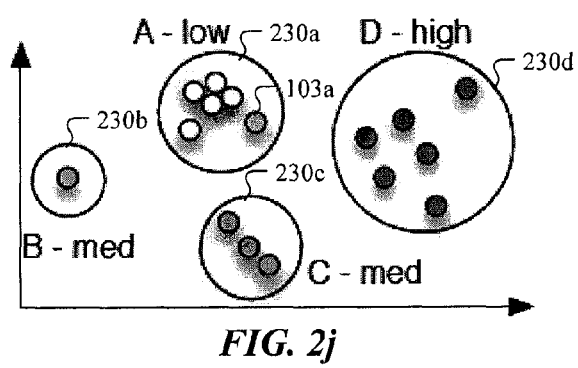
Figure 2K:
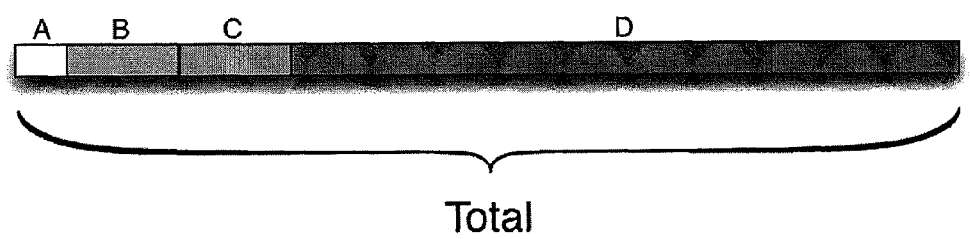

FIGS. 2j and 2k illustrate the probabilities of candidates being selected from a set of documents. FIG. 2j illustrates four sets of documents: sets 230a-230d. After computing Total from Equation 1 above, it may be visualized as a number line as illustrated in FIG. 2k. In this example, each set 230 occupies some space on a number line proportional to the sum of the probabilities of each document in that set being selected as a candidate. If a random point on the line is selected at random, it is clear how the probability varies for which set 230 that random number appears in. Each sets 230 is divided into the real estate that each document 101 owns on the number line, and a random number may then select a specific document 101.

FIGS. 3a and 3b illustrate an example method 300 for providing representative documents 103 for an input document set 102. In some embodiments, method 300 may be used on large collections of documents 101. For example, method 300 may be used to provide one or more representative documents 103 for an input document set 102 that contains one hundred or more documents 101 or over one million documents 101. As used herein, a large collection of documents 101 refers to any number of documents 101 that may take an undesired amount of time or computing resources to process using other methods such as method 400 described in more detail below.

In general, method 300 accesses input from person 110 and outputs one or more representative documents 103. The input from person 110 may include one or more of input document set 102 (which includes documents 101), input representative document set 104 (which may include one or more input representative documents 103), and an indication 108 of how many representative documents 103 are desired as output. Certain embodiments of method 300 then perform the following general steps to select one or more documents 101 in input document set 102 as representative documents 103:

1. If input representative document set 104 is empty, initialize the system as if there is only one representative document 103 that is an equal distance from every document 101 in the system. Otherwise, for each document 101 in the full set, calculate and record the minimum distance to a document in the representative document set. (Distance is Euclidean distance squared.)
2. Select a predetermined number of candidates using k-means++ probabilistic seed selection. For example, select 256, 1024, or any other appropriate number of candidates.
3. Calculate which candidate produces the lowest Total (see Equation 1 above) when added to the current list of representative documents 103.
4. Add the best candidate from step 3 to the current list of representative documents 103.
5. Update the minimum distance from each document 101 to a representative document 103 to reflect the candidate that was added.
6. Repeat steps 2 through 5 until the desired number of additional representative documents have been selected. For example, if person 110 indicated with indication 108 that he desired ten representative documents 103, repeat steps 2-5 nine more times.

Returning to FIGS. 3a and 3b for more specificity, certain embodiments of method 300 begin in step 310 where an input document set "D" is accessed. In some embodiments, D may be input document set 102 described above. In certain embodiments, D may contain any number of documents "d" (e.g., documents 101a-101n). In some embodiments, an input representative document set "R" is also accessed in step 310. For example, R may refer to input representative document set 104 described above and may include input representative documents "r" such as input representative documents 103a-103b. In certain embodiments, R may be empty and not contain any input representative documents r.

In step 320, a term-document matrix (TDM) is generated from D and R accessed in step 310. For example, TDM 325 as illustrated in FIG. 3a may be generated in step 320 from D and R. The TDM generated in step 320 is a matrix where each d is represented by a vector indicating the terms found in that d. While any TDM may be generated by step 320, better TDMs will produce better results. Standard techniques like tf-idf or log-entropy weighting for the vectors in the TDM may be utilized in step 320 to improve results. More details about specific techniques which may be used to produce an improved TDM may be found in U.S. patent application Ser. No. 13/326,284 ("Multi-Concept Latent Semantic Analysis Queries") which is incorporated herein by reference. Some embodiments may also utilize techniques like fast phrase identification and fast boilerplate removal to create term vocabularies that include high quality phrases, and to produce term vectors focused on real content instead of meaningless boilerplate language. More details about specific techniques to create term vocabularies that include high quality phrases may be found in U.S. patent application Ser. No. 13/326,120 ("System and Method for Identifying Phrases in Text") which is incorporated herein by reference.

In step 330, a distance from each d in D to a closest r in R is calculated and recorded. In some embodiments, the distance refers to the square of a Euclidean distance and the square of the Euclidean distance from each d in D to a closest r in R may be found using Equation 3 below:

$$\min_{r \in R} \|d - r\|^2 \quad \text{(Equation 3)}$$

In step 340, a candidate subset "C" is selected from D. C (e.g., subset 345) includes candidates "c" (e.g., 341a-341n), which are documents d selected from D. In some embodiments, any appropriate algorithm for choosing initial seed values may be used to select C. In some embodiments, the algorithm used in step 340 is the k-means++ probabilistic seed selection according to Equations 4 and 5 below:

$$\text{Total} = \sum_{d \in D} \min_{r \in R} \|d - r\|^2 \qquad \text{(Equation 4)}$$

$$\text{PROBABILITY} = \frac{\min_{r \in R} \|d - r\|^2}{\text{Total}} \qquad \text{(Equation 5)}$$

Here, PROBABILITY is the probability for a particular d in D being selected as a candidate c. PROBABILITY is calculated for each d in D step 340 by dividing that document's minimum Euclidean distance (calculated in step 330) by Total. The sum of the PROBABILITY values for all documents d should be one.

After calculating PROBABILITY for each d in D, candidates c are selected at random using the calculated PROBABILITY scores. To visualize this, consider every document d being laid out on a number line from zero to one, occupying space proportional to its PROBABILITY on the number line (e.g., FIG. 2k). If a value is picked at random (using a selection method where any point on the number line is equally likely) that is somewhere between 0 and 1, the document that owns the point on the number line is selected as a candidate c. The following is an example algorithm for accomplishing the random selection of candidates c using random values:

Let P(i) be the PROBABILITY that document di is selected where di is in D.

Let v=a random value between 0 and 1.

Let position=0.

Let i=0.

while (position<v)

position=position+P(i)

i=i+1

Let candidate=di

The above algorithm selects a single candidate c. However, this algorithm may be run multiple times to select many candidates c (e.g., 256 times). Some embodiments may check to make sure unique candidates are being selected, and if not, continue selecting candidates until the desired number of unique candidates are selected.

Steps 350-370 are repeated for each c in C. For example, if there are 256 candidates c in C, steps 350-370 are repeated 256 times. In step 350, the first c in C is added to R to produce set "Rc" as illustrated in FIG. 3b as set 355. (The second time through steps 350-370, the second c in C is added to R to produce set Rc, and so forth.) Rc includes representative documents "rc" (e.g., 356a-356n), which are any representative documents 103 input by person 110 in input representative document set 104 or any representative documents 103 previously chosen by method 300, plus c that was added in step 350. Also in step 350, the first c in C is removed from D to produce set "Dc" as illustrated in FIG. 3b as set 357. (The second time through steps 350-370, the second c in C is removed from D to produce Dc, and so forth.) Dc includes documents "dc" (e.g., 358a-358n), which are all of documents 101 in input document set 102 minus c that was removed in step 350.

In step 360, a distance is calculated from every dc in Dc to every rc in Rc. In some embodiments, the distance is the Euclidean distance squared. For each dc in Dc, step 360 locates the rc that is the minimum Euclidean distance squared according to Equation 6 below:

$$\min_{rc \in Rc} \|dc - rc\|^2 \qquad \text{(Equation 6)}$$

In step 370, TOTALc for each dc in Dc is calculated according to Equation 7 below:

$$TOTALc = \sum_{dc \in Dc} \min_{rc \in Rc} \|dc - rc\|^2 \qquad \text{(Equation 7)}$$

In step 380, the c in C that resulted in the lowest TOTALc in step 370 is selected as a representative document 103. The selected c is then moved from D to R.

After step 380, certain embodiments may update the distances calculated in step 330 from each d in D to a closest r in R in order to reflect the new representative document 103 that was selected in step 380. Steps 340-380 may then be repeated as many times as desired according to how many representative documents 103 are desired. For example, if ten additional representative documents 103 are desired, steps 340-380 may be repeated ten times. After the desired amount of representative documents 103 are found for input document set 102, method 300 may transmit or otherwise indicate output representative document set 106 to person 110.

FIG. 4 illustrates an example method 400 for providing representative documents 103 for an input document set 102. In some embodiments, method 400 may be used on small collections of documents 101. For example, method 400 may be used to provide one or more representative documents 103 for an input document set 102 that contains one hundred documents 101 or fewer. As used herein, a small collection of documents 101 refers to any number of documents 101 that may be processed using method 400 in a desired amount of time.

In general, method 400 accesses input from person 110 and outputs one or more representative documents 103. The input from person 110 may include one or more of input document set 102 (which includes documents 101) and an indication 108 of how many representative documents 103 are desired as output. Certain embodiments of method 400 then perform the following general steps to select one or more documents 101 in input document set 102 as representative documents 103:

1. Use every document that is not already a representative document as a candidate for the next representative document (first time through this is all of the documents).
2. Calculate which candidate produces the lowest Total (see Equation 1 above) when added to the current list of representative documents 103.
3. Add the best candidate from step 3 to the current list of representative documents 103.
4. Update the minimum distance from each document 101 to a representative document 103 to reflect the candidate that was added.
5. Repeat steps 1 through 4 until the desired number of additional representative documents have been selected. For example, if person 110 indicated with indication 108 that he desired ten representative documents 103, repeat steps 1-4 nine more times.

Returning to FIG. 4 for more specificity, certain embodiments of method 400 begin in step 410 where an input document set "D" is accessed. In some embodiments, D may be input document set 102 described above. In certain embodiments, D may contain any number of documents "d" (e.g., documents 101a-101n).

In step 420, a TDM is generated from D accessed in step 410. The TDM generated in step 420 is a matrix where each d is represented by a vector indicating the terms found in that d. As discussed above, standard techniques like tf-idf or log-entropy weighting for the vectors in the TDM may be utilized in step 420 to improve results. Some embodiments may also utilize techniques like fast phrase identification and fast boilerplate removal to create term vocabularies that include high quality phrases, and to produce term vectors focused on real content instead of meaningless boilerplate.

Steps 430-450 are repeated for each d in D. For example, if there are 100 documents d in D, steps 430-450 are repeated 100 times. In step 430, the first d in D is added to R to produce set "Rc" as illustrated in FIG. 4 as set 435. (The second time through steps 430-450, the second d in D is added to R to produce set Rc, and so forth.) Rc includes representative documents "rc" (e.g., 436a-436n), which may be any representative documents 103 input by person 110 in input representative document set 104 or any representative documents 103 previously chosen by method 300, plus d that was added in step 430. Also in step 430, the first d in D is removed from D to produce set "Dc" as illustrated in FIG. 4 as set 437. (The second time through steps 430-450, the second d in D is removed from D to produce Dc, and so forth.) Dc includes documents "dc" (e.g., 438a-438n), which are all of documents 101 in input document set 102 minus d that was removed in step 430.

In step 440, a distance is calculated from every dc in Dc to every rc in Rc. In some embodiments, the distance is the Euclidean distance squared. For each dc in Dc, step 360 locates the rc that is the minimum Euclidean distance squared according to Equation 8 below:

$$\min_{rc \in Rc} \|dc - rc\|^2 \qquad \text{(Equation 8)}$$

In step 450, TOTALc for each dc in Dc is calculated according to Equation 9 below:

$$TOTALc = \sum_{dc \in Dc} \min_{rc \in Rc} \|dc - rc\|^2 \qquad \text{(Equation 9)}$$

In step 460, the d in D that resulted in the lowest TOTALc in step 450 is selected as a representative document 103. The selected d is then moved from D to R.

After step 460, certain embodiments of method 400 may update the distances from each d in D to a closest r in R in order to reflect the new representative document 103 that was selected in step 450. Steps 430-460 may then be repeated as many times as desired according to how many representative documents 103 are desired. For example, if ten additional representative documents 103 are desired, steps 430-460 may be repeated ten times. After the desired amount of representative documents 103 are found for input document set 102, method 400 may transmit or otherwise indicate output representative document set 106 to person 110.

Figure 5:
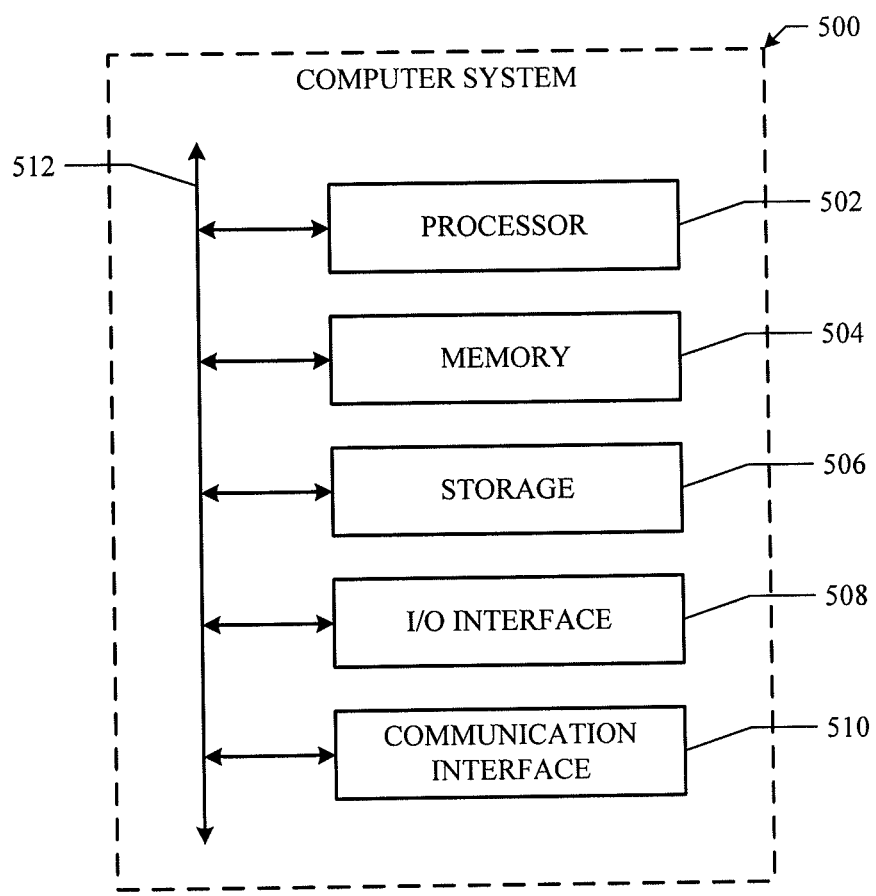
FIG. 5 illustrates a computer system where particular embodiments of the disclosure may be implemented.

FIG. 5 illustrates an example computer system 500. Computer system 500 may be utilized by computer system 130 of FIG. 1. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANS- PORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

The components of computer system 500 may be integrated or separated. In some embodiments, components of computer system 500 may each be housed within a single chassis. The operations of computer system 500 may be performed by more, fewer, or other components. Additionally, operations of computer system 500 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
one or more memory units; and
one or more processing units operable to:
    access a set of documents;
    for each particular document of the set of documents, determine a distance from the particular document to a nearest document in a set of representative documents;
    select a subset of documents using an algorithm for choosing initial seed values and the determined distances to the nearest representative document, the subset of documents comprising a predetermined number of documents from the set of documents;
    repeat for each particular document of the subset of documents:
        add the particular document of the subset of documents to the set of representative documents to create a new set of representative documents;
        remove the particular document of the subset of documents from the set of documents to create a new set of documents; and
        calculate a sum of distances from each document of the new set of documents to a nearest document in the new set of representative documents; and
    select as a new representative document the particular document of the subset of documents that resulted in the lowest sum of distances.

2. The system of claim 1, the one or more processing units further operable to:
generate a first term-document matrix (TDM) comprising terms from the set of documents; and
generate a second TDM comprising terms from the subset of documents;
wherein:
    determining the distances to a nearest representative document identified in the set of representative documents comprises utilizing the first TDM; and
    calculating the sum of distances from each document of the new set of documents to a nearest document in the new set of representative documents comprises utilizing the second TDM.

3. The system of claim 1, wherein the distance from each particular document in the set of documents to a nearest document in the set of representative documents comprises a Euclidean distance squared.

4. The system of claim 1, wherein the algorithm for choosing initial seed values comprises k-means++ probabilistic seed selection.

5. The system of claim 1, wherein determining the distance from each particular document of the set of documents to a nearest document in the set of representative documents comprises utilizing the following equation:

$$\min_{r \in R} \|d - r\|^2;$$

wherein R is the set of representative documents, d is a document in the set of documents, and r is a document in the set of representative documents.

6. The system of claim 1, wherein selecting the subset of documents comprises:
calculating a total using the following equation:

$$\text{Total} = \sum_{d \in D} \min_{r \in R} \|d - r\|^2;$$

calculating a probability for each document in the set of documents according to the following equation:

$$\frac{\min_{r \in R} \|d - r\|^2}{\text{Total}}; \text{ and}$$

randomly selecting a predetermined number of the documents in the set of documents based on the calculated probabilities;

wherein D is the set of documents, R is the set of representative documents, d is a document in the set of documents, and r is a document in the set of representative documents.

7. The system of claim 1, wherein calculating the sum of distances from each document of the new set of documents to a nearest document in the new set of representative documents comprises utilizing the following equation:

$$TOTALc = \sum_{dc \in Dc} \min_{rc \in Rc} \|dc - rc\|^2;$$

wherein Dc is the new set of documents, Rc is the new set of representative documents, dc is a document in the new set of documents, and rc is a document in the new set of representative documents.

8. A computer-implemented method, comprising:
accessing, by one or more computing systems, a set of documents;
for each particular document of the set of documents, determining, by the one or more computing systems, a distance from the particular document to a nearest document in a set of representative documents;
selecting, by the one or more computing systems using an algorithm for choosing initial seed values and the determined distances to the nearest representative document, a subset of documents, the subset of documents comprising a predetermined number of documents from the set of documents;
repeating, by the one or more computing systems, for each particular document of the subset of documents:
adding the particular document of the subset of documents to the set of representative documents to create a new set of representative documents;
removing the particular document of the subset of documents from the set of documents to create a new set of documents; and
calculating a sum of distances from each document of the new set of documents to a nearest document in the new set of representative documents; and
selecting, by the one or more computing systems, the particular document of the subset of documents that resulted in the lowest sum of distances as a new representative document.

9. The computer-implemented method 8 further comprising:
generating, by the one or more computing systems, a first term-document matrix (TDM) comprising terms from the set of documents; and
generating, by the one or more computing systems, a second TDM comprising terms from the subset of documents;

wherein:
determining the distances to a nearest representative document identified in the set of representative documents comprises utilizing the first TDM; and
calculating the sum of distances from each document of the new set of documents to a nearest document in the new set of representative documents comprises utilizing the second TDM.

10. The computer-implemented method 8, wherein the distance from each particular document in the set of documents to a nearest document in the set of representative documents comprises a Euclidean distance squared.

11. The computer-implemented method 8, wherein the algorithm for choosing initial seed values comprises k-means++ probabilistic seed selection.

12. The computer-implemented method 8, wherein determining the distance from each particular document of the set of documents to a nearest document in the set of representative documents comprises utilizing the following equation:

$$\min_{r \in R} \|d - r\|^2;$$

wherein R is the set of representative documents, d is a document in the set of documents, and r is a document in the set of representative documents.

13. The computer-implemented method 8, wherein selecting the subset of documents comprises:
calculating a total using the following equation:

$$\text{Total} = \sum_{d \in D} \min_{r \in R} \|d - r\|^2;$$

calculating a probability for each document in the set of documents according to the following equation:

$$\frac{\min_{r \in R} \|d - r\|^2}{\text{Total}};$$

and
randomly selecting a predetermined number of the documents in the set of documents using the calculated probabilities;
wherein D is the set of documents, R is the set of representative documents, d is a document in the set of documents, and r is a document in the set of representative documents.

14. The computer-implemented method 8, wherein calculating the sum of distances from each document of the new set of documents to a nearest document in the new set of representative documents comprises utilizing the following equation:

$$TOTALc = \sum_{dc \in Dc} \min_{rc \in Rc} \|dc - rc\|^2;$$

wherein Dc is the new set of documents, Rc is the new set of representative documents, dc is a document in the new set of documents, and rc is a document in the new set of representative documents.

15. A non-transitory computer-readable medium comprising software, the software when executed by one or more processing units operable to perform operations comprising:
   accessing a set of documents;
   repeating for each particular document of the set of documents:
      adding the particular document to a set of representative documents to create a new set of representative documents;
      removing the particular document from the set of documents to create a new set of documents; and
      calculating a sum of distances from each document of the new set of documents to a nearest document in the new set of representative documents; and
   selecting the particular document of the set of documents that resulted in the lowest sum of distances as a new representative document.

16. The non-transitory computer-readable medium of claim 15, the operations further comprising generating a term-document matrix (TDM) comprising terms from the set of documents, wherein calculating the sum of distances from each document of the new set of documents to a nearest document in the new set of representative documents comprises utilizing the generated TDM.

17. The non-transitory computer-readable medium of claim 15, wherein the distances from each document of the new set of documents to a nearest document in the new set of representative documents comprises a Euclidean distance squared.

18. The non-transitory computer-readable medium of claim 15, wherein determining the distance from each particular document of the set of documents to a nearest document in the set of representative documents comprises utilizing the following equation:

$$\min_{r \in R} \|d - r\|^2;$$

wherein R is the set of representative documents, d is a document in the set of documents, and r is a document in the set of representative documents.

19. The non-transitory computer-readable medium of claim 15, wherein calculating the sum of distances from each document of the new set of documents to a nearest document in the new set of representative documents comprises utilizing the following equation:

$$TOTALc = \sum_{dc \in Dc} \min_{rc \in Rc} \|dc - rc\|^2;$$

wherein Dc is the new set of documents, Rc is the new set of representative documents, dc is a document in the new set of documents, and rc is a document in the new set of representative documents.

20. The non-transitory computer-readable medium of claim 15, the operations further comprising presenting the new representative document to a user.

* * * * *